United States Patent [19]

Purcell

[11] Patent Number: 5,623,434
[45] Date of Patent: Apr. 22, 1997

[54] STRUCTURE AND METHOD OF USING AN ARITHMETIC AND LOGIC UNIT FOR CARRY PROPAGATION STAGE OF A MULTIPLIER

[75] Inventor: Stephen C. Purcell, Mountain View, Calif.

[73] Assignee: Chromatic Research, Inc., Santa Clara County, Calif.

[21] Appl. No.: 281,377

[22] Filed: Jul. 27, 1994

[51] Int. Cl.[6] .............................. G06F 7/52; G06F 7/50
[52] U.S. Cl. ..................... 364/757; 364/736; 364/754; 364/787
[58] Field of Search ..................... 364/757, 754, 364/758, 759, 760, 736, 755, 756, 768, 784–788

[56] References Cited

U.S. PATENT DOCUMENTS

| | | | |
|---|---|---|---|
| 5,204,828 | 4/1993 | Kohn | 364/736 |
| 5,227,987 | 7/1993 | Imazawa et al. | 364/606 |
| 5,245,564 | 9/1993 | Quek et al. | 364/754 |
| 5,299,319 | 3/1994 | Vassiliadis et al. | 395/375 |
| 5,359,718 | 10/1994 | Phillips et al. | 395/375 |
| 5,426,743 | 6/1995 | Phillips et al. | 395/375 |

*Primary Examiner*—Paul P. Gordon
*Assistant Examiner*—Emmanuel L. Moise
*Attorney, Agent, or Firm*—Skjerven, Morrill, MacPherson, Franklin & Friel; Alan H. MacPherson; E. Eric Hoffman

[57] ABSTRACT

A multiplier circuit for use in a system which includes an arithmetic and logic unit (ALU). The multiplier circuit includes a carry save stage which receives a first data value and a second data value, and in response, creates a carry signal and a sum signal. The carry and sum signals are provided to input leads of the ALU. The ALU is used to add the carry and sum signals to create a third data value which is equal to the product of the first and second data values. In one embodiment, the input leads to the ALU are multiplexed. Thus, one input lead of the ALU receives either the carry signal or a signal from a first input node and the second input lead of the ALU receives either the sum signal or a signal from a second input node.

11 Claims, 5 Drawing Sheets

STRUCTURE AND METHOD OF USING AN ARITHMETIC AND LOGIC UNIT FOR CARRY PROPAGATION STAGE OF A MULTIPLIER

BACKGROUND OF THE INVENTION

1. Field of the Invention

The present invention relates to multiplier circuitry for use in a data processing system. In particular, the present invention relates to a structure and method for using an arithmetic and logic unit (ALU) within a multiplier circuit.

2. Description of the Prior Art

FIG. 1a is a block diagram illustrating a conventional multiplier circuit 100 in the same data processing system as ALU 130. ALU 130 is a conventional circuit which performs arithmetic and logic operations within the data processing system. ALU 130 includes registers 131 and 132 which receive input data values from input nodes 102 and 103, respectively. These input data values typically include a plurality of parallel digital signals. The input data values stored in registers 131 and 132 are processed within ALU 130 in a manner known in the art such that a desired operation (e.g., addition) is performed on the two input data values. The resulting output signal from ALU 130 is provided to multiplexer 140 on bus 135.

Multiplier circuit 100 includes registers 111 and 112, carry save stage 110, pipeline register 116, carry propagate adder 118 and buses 104, 105, 115, 117 and 119. Multiplier circuit 100 receives a first data value from input node 102 on lead 104 and a second data value from input node 103 on bus 105. The first and second data values are typically read into registers 111 and 112, respectively. Carry save stage 110 receives the first and second data values from input registers 111 and 112 and in response produces a carry signal and a sum signal.

FIG. 1b is a schematic diagram of a conventional carry save stage 110 used in the multiplication of two 4-bit data values (e.g., A[3:0] and B[3:0]). AND gates 151–166 receive bits A0–A3 of A[3:0] and bits B0–B3 of B[3:0]. Carry save adders 170–185 are conventional circuits which are connected as illustrated.

FIG. 1c is a schematic diagram illustrating the operation of carry save adder 180. Carry save adders 170–179 and 181–185 operate in a manner similar to carry save adder 180. Carry save stage 110 (FIG. 1b) generates two output signals. One output signal is a sum signal S[6:0], which is made up of save bits S6–S0. The other output signal is a carry signal C[6:0], which includes carry bits C6–C1 as the six most significant bits and a zero bit as the least significant bit.

The carry and sum signals are provided to pipeline register 116 of carry propagate adder 118 on buses 115 and 117, respectively. Carry propagate adder 118 adds the sum and carry signals, thereby creating a third data value which is equal to the product of the first and second data values. This third data value is provided to multiplexer 140 on bus 119. When multiplier circuit 100 is enabled, a multiplexer select signal on bus 141 causes multiplexer 140 to route the third data value from multiplier circuit 100 through multiplexer 140 to output node 150 on bus 148.

During system operations which do not involve multiplier circuit 100, the first and second data values are provided from input nodes 102 and 103 to registers 131 and 132 of ALU 130 as previously described. ALU 130 then performs the desired operation to provide an output signal on bus 135. The multiplexer select signal on bus 141 is selected to route the output signal of ALU 130 through multiplexer 140 to output node 150 on bus 148.

Multiplier circuit 100, ALU 130 and multiplexer 140 are often fabricated on a semiconductor chip. Because it is desirable to reduce the layout area of circuits fabricated on semiconductor chips, it would be desirable to minimize the layout area of the circuitry used to perform the functions previously described in connection with FIG. 1.

SUMMARY OF THE INVENTION

In accordance with the present invention, a multiplier circuit is provided for use in a system which includes an ALU. This multiplier circuit includes a carry save stage which receives a first and a second data value from a first and a second input node, respectively. The output signals from the carry save stage include a carry signal and a sum signal. The carry and sum signals are provided to input buses of an ALU. The ALU is used to add the carry and sum signals to provide a third data value which is equal to the product of the first and second data values.

In one embodiment of the present invention the input buses to the ALU are multiplexed. That is, one input bus of the ALU may receive either the carry signal or a signal from the first input node and the second input bus of the ALU may receive either the sum signal or a signal from the second input node. In this manner, the pipeline register and carry propagate adder required by prior art multiplier circuits are eliminated.

In another embodiment of the present invention a method of multiplying a first data value and a second data value in a system having an ALU is provided. The first and second data values are multiplied in a carry save stage, thereby generating a carry signal and a sum signal. The carry and sum signals are then transmitted to the ALU. The ALU adds the carry and sum signals to produce a third data value equal to the product of the first and second data values.

The present invention will be more fully understood in view of the following drawings taken together with the detailed description.

DETAILED DESCRIPTION OF THE INVENTION

Figure 2:
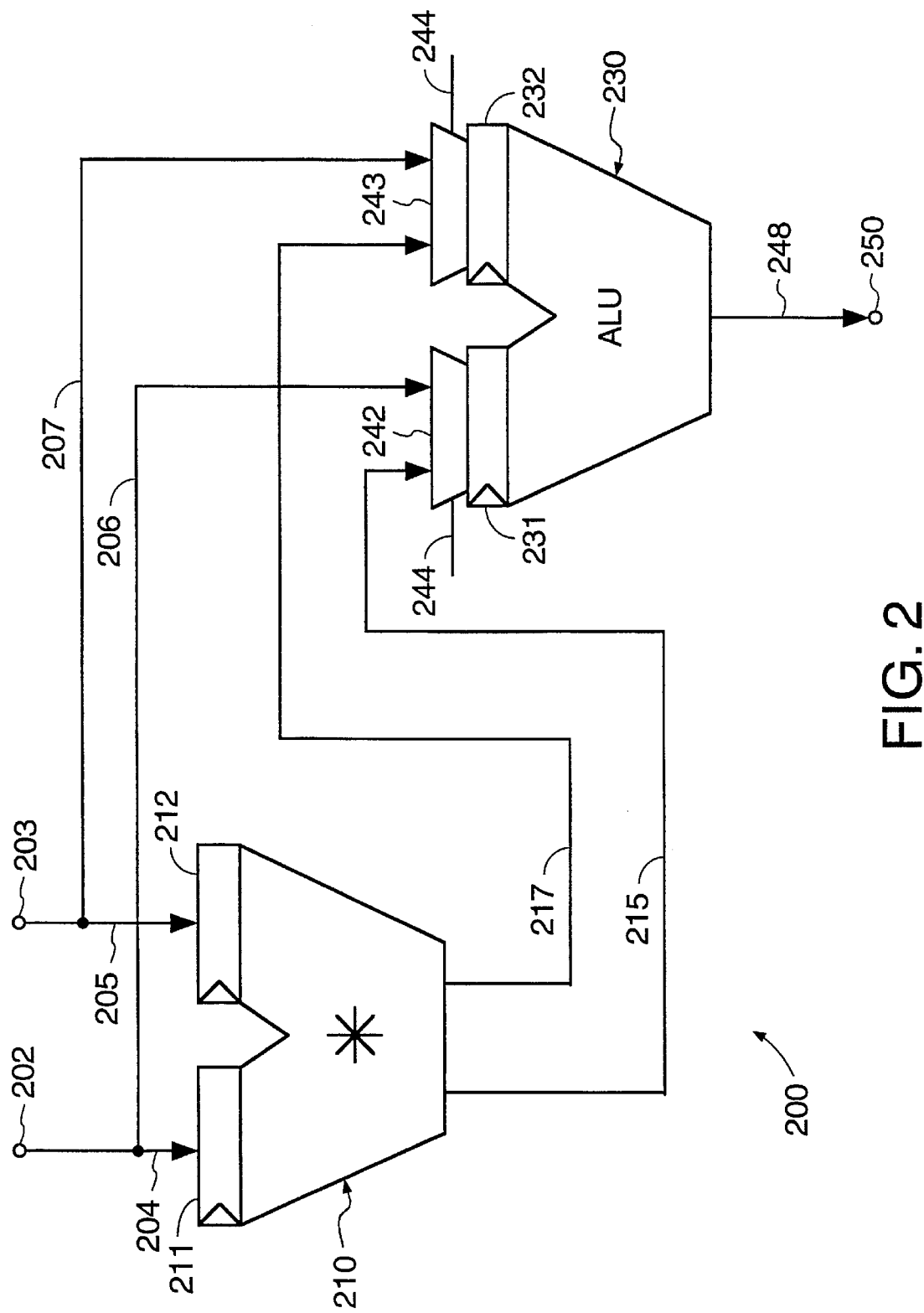
FIG. 2 is a block diagram of a multiplier circuit in accordance with one embodiment of the present invention.

FIG. 2 is a schematic diagram illustrating one embodiment of multiplier circuit 200 in accordance with one embodiment of the present invention. A first data value is provided from input node 202 to register 211 on lead 204. Similarly, a second data value is provided from input node 203 to register 212 on lead 205. Carry save stage 210 receives the first and second data values from registers 211 and 212. Carry save stage 210 is a conventional circuit which generates a carry signal and a sum signal in response to the first and second data values. The carry signal is provided to multiplexer 242 on bus 215 and the sum signal is provided to multiplexer 243 on bus 217. When performing a multiplication operation, a multiplexer select signal on buses 241 and 244 causes multiplexers 242 and 243 to route the carry and sum signals to registers 231 and 232, respectively. The multiplexer select signal is controlled by a programmable operation code which is provided within the data processing system which includes multiplier circuit 200. ALU 230, which includes an adder circuit, then adds the contents of registers 231 and 232 to create a third data value equal to the product of the first and second data values. This third data value is provided to output node 250 on bus 248.

Buses 206 and 207 couple input nodes 202 and 203 to multiplexers 242 and 243, respectively. When a multiplication is not being performed, the multiplexer select signal on buses 241 and 244 is selected to cause the first and second data values from input nodes 202 and 203 to be read into registers 231 and 232, respectively. ALU 230 then performs the desired operation on the contents of registers 231 and 232. Again, the output signal of ALU 230 is provided to output node 250 on bus 248.

Figure 3:
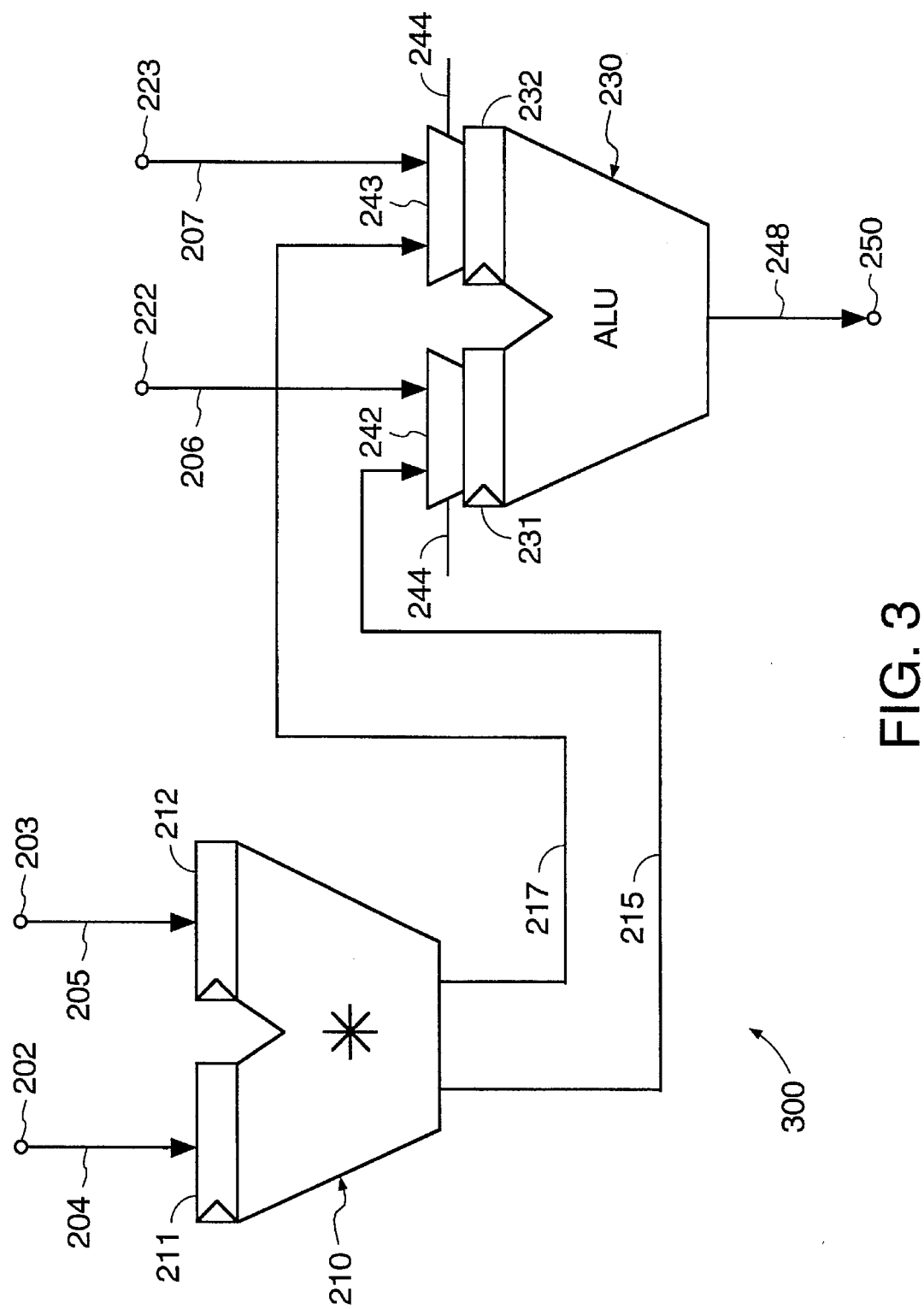
FIG. 3 is a schematic diagram of a multiplier circuit in accordance with an alternate embodiment of the present invention.

FIG. 3 is a schematic diagram of a multiplier circuit 300 in accordance with an alternate embodiment of the present invention. Similar elements in multiplier circuits 200 and 300 are labeled with similar numbers. However, in multiplier circuit 300, data values from input nodes 222 and 223 (rather than input nodes 202 and 203) are provided to multiplexers 242 and 243 on buses 206 and 207, respectively.

Figure 1A:
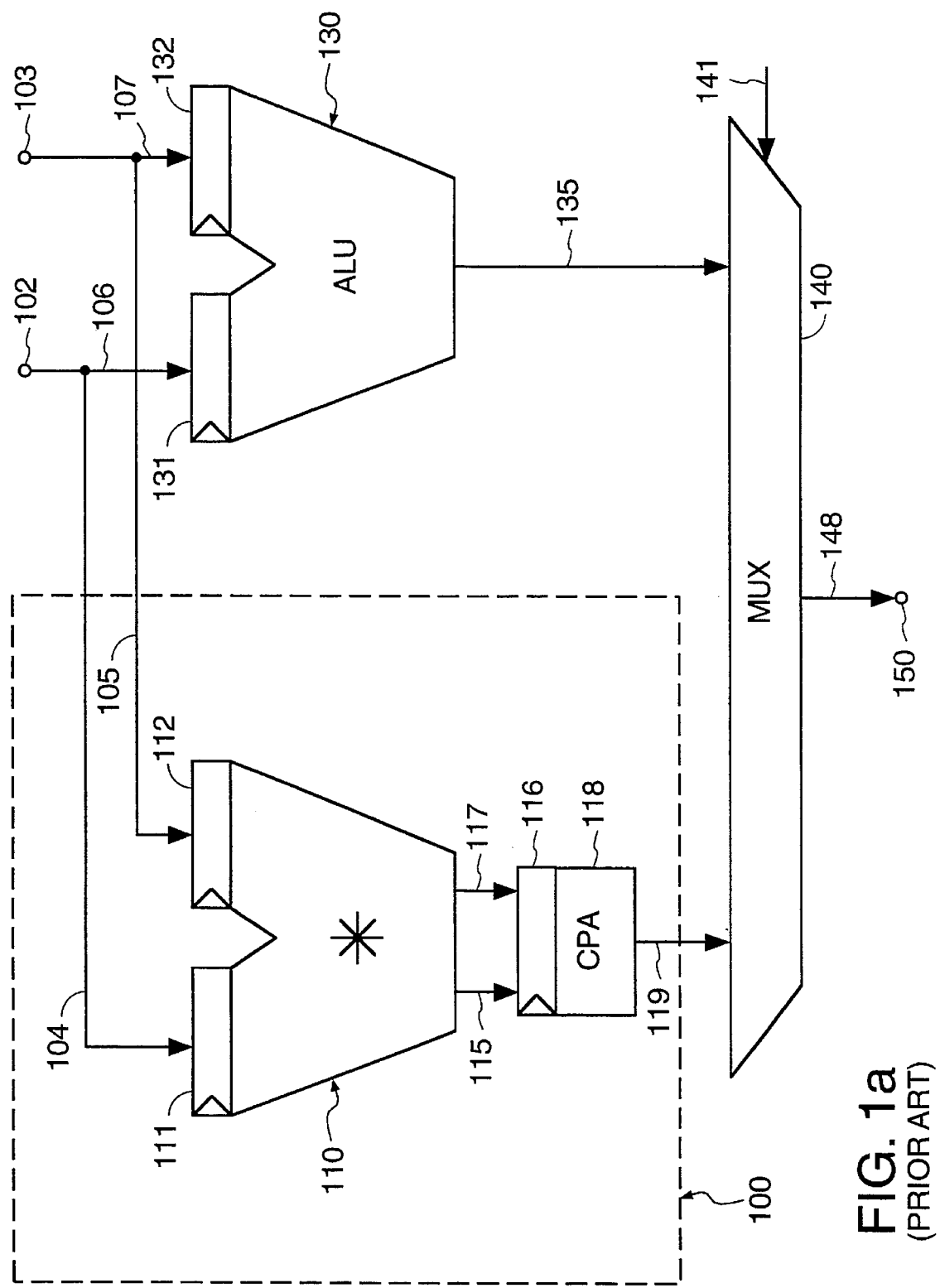
FIG. 1a is a block diagram of a prior art multiplier circuit.
Figure 1B:
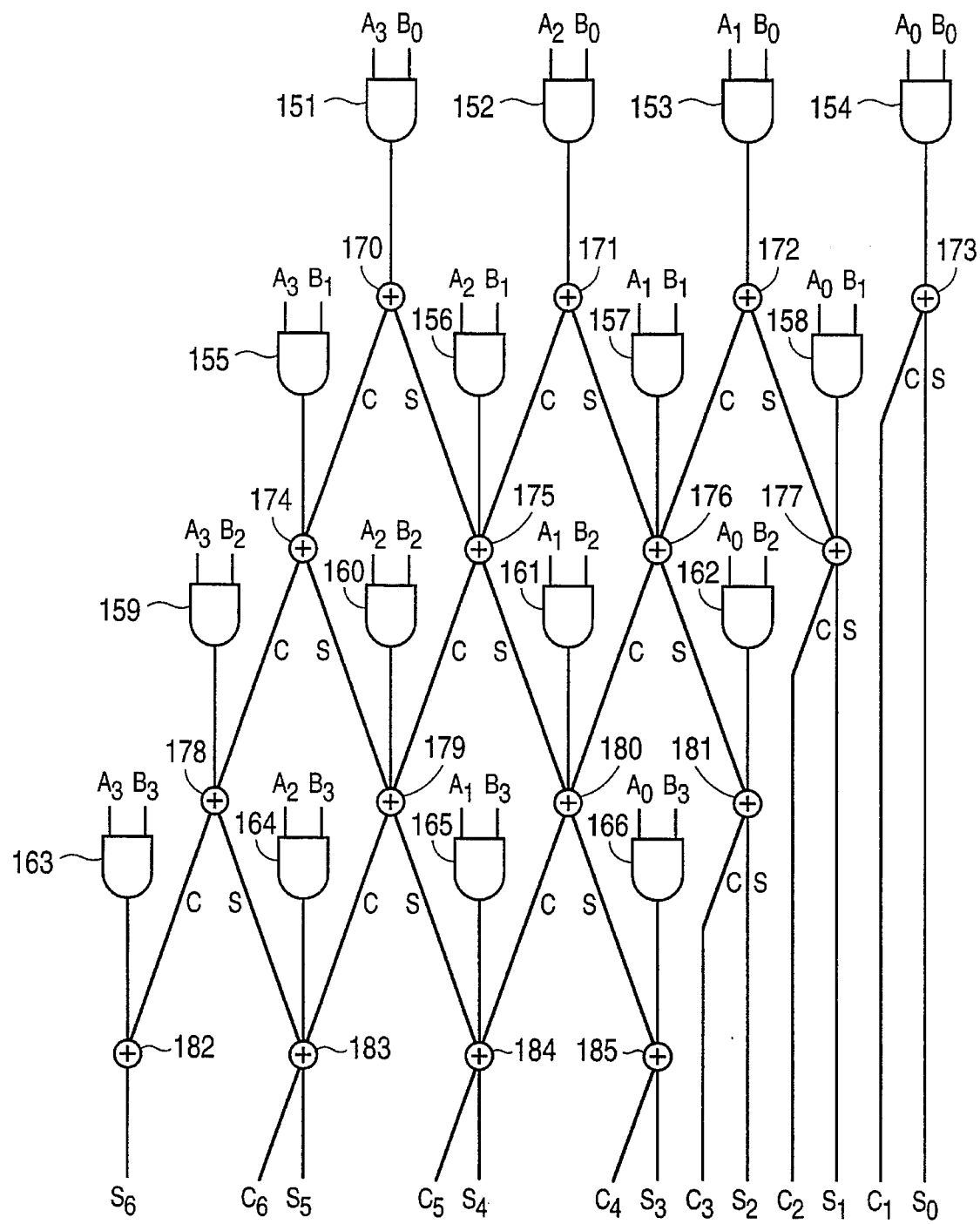
FIG. 1b is a schematic diagram of a conventional prior art carry save stage.
Figure 1C:
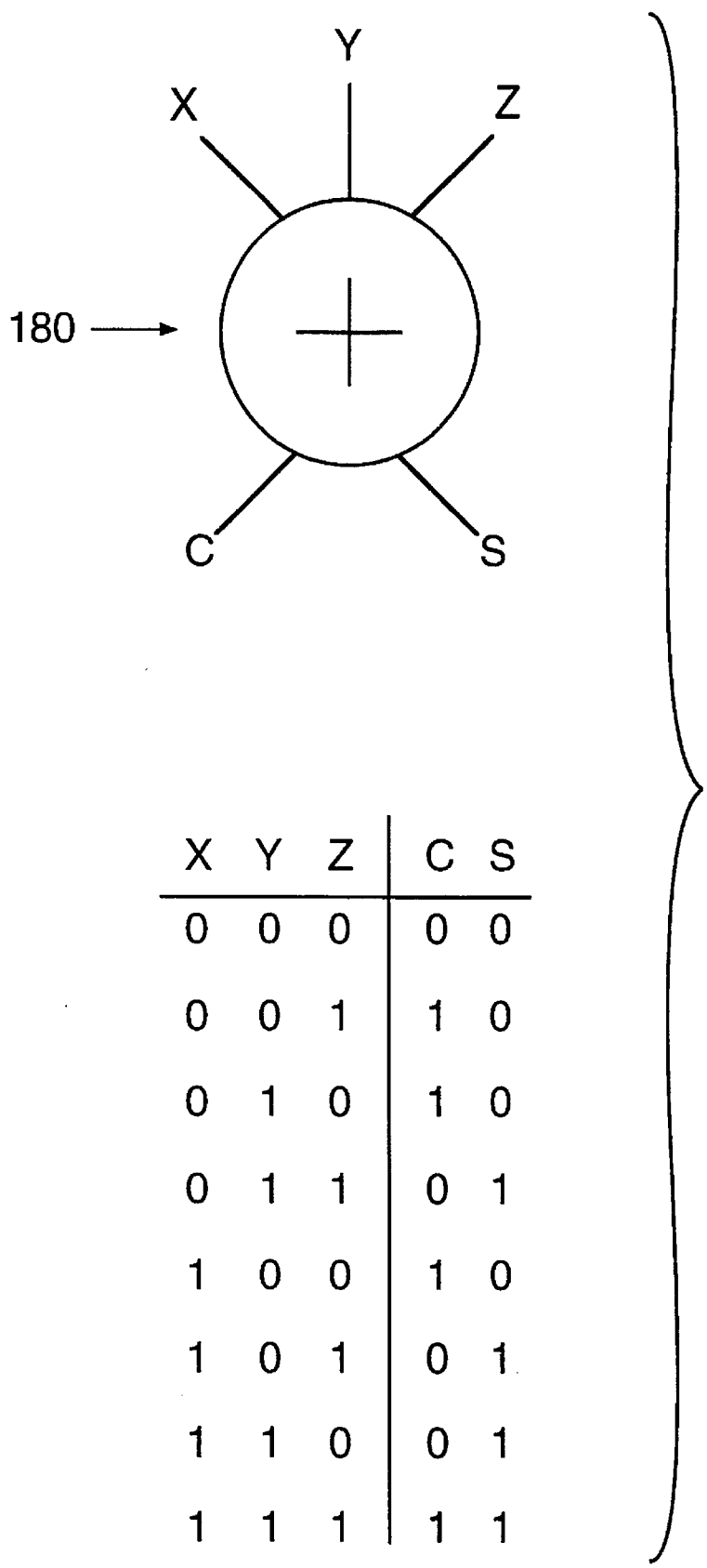
FIG. 1c is a schematic diagram of a conventional carry save adder.

By utilizing ALU 230 in the manner previously described, carry propagate adder 118 (FIG. 1a) and pipeline register 116 required in prior art multiplier circuit 100 are eliminated. In one embodiment, the first and second data values provided to input nodes 202 and 203 (FIGS. 2) are 18-bit words. In such an embodiment, multiplier circuit 200 advantageously has a layout area which is approximately ten percent smaller than the layout area of multiplier circuit 100. Moreover, in such an embodiment, multiplier circuit 200 has approximately 2000 fewer transistors than multiplier circuit 100.

While the present invention has been described in connection with a particular embodiment, it is understood that the invention is not limited to the embodiment disclosed, but is capable of various modifications which would be apparent to one of ordinary skill in the art. For example, the first and second data values provided to input nodes 202 and 203 can have any number of bits. Thus, the present invention is limited only by the following claims.

I claim:

1. A multiplier for use in a data processing system having an arithmetic and logic unit (ALU), said multiplier comprising:

a first input terminal for receiving a first data value;

a second input terminal for receiving a second data value;

a carry save stage coupled to said first and second terminals, wherein said carry save stage generates a carry signal and a sum signal in response to said first and second data values;

a first bus coupling said carry save stage to said ALU, wherein said first bus provides said carry signal to said ALU;

a second bus coupling said carry save stage to said ALU, wherein said second bus provides said sum signal to said ALU;

a first multiplexer coupled between said first bus and said ALU; and a second multiplexer coupled between said second bus and said ALU, whereby said ALU is capable of adding said carry and sum signals to create a third data value equal to the product of said first and second data values.

2. The multiplier of claim 1, further comprising:

a third bus coupled between said first terminal and said first multiplexer; and a fourth bus coupled between said second terminal and said second multiplexer.

3. The multiplier of claim 2, further comprising:

a first register coupled between said first multiplexer and said ALU, wherein said carry signal is stored in said first register; and a second register coupled between said second multiplexer and said ALU, wherein said sum signal is stored in said second register.

4. The multiplier of claim 2, further comprising multiplexer select means coupled to said first and second multiplexers, said multiplexer select means having a first state and a second state, wherein said multiplexer select means causes said first multiplexer to route said carry signal to said ALU and causes said second multiplexer to route said sum signal to said ALU when said multiplexer select means is in said first state, and wherein said multiplexer select means causes said first multiplexer to route said first data value to said ALU and causes said second multiplexer to route said second data value to said ALU when said multiplexer select means is in said second state.

5. The multiplier of claim 1, further comprising:

a third terminal for receiving a third data value;

a fourth terminal for receiving a fourth data value;

a third bus coupled between said third terminal and said first multiplexer; and a fourth bus coupled between said fourth terminal and said second multiplexer.

6. The multiplier of claim 5, further comprising:

a first register coupled between said first multiplexer and said ALU, wherein said carry signal is stored in said first register; and a second register coupled between said second multiplexer and said ALU, wherein said sum signal is stored in said second register.

7. The multiplier of claim 5, further comprising multiplexer select means coupled to said first and second multiplexers, said multiplexer select means having a first state and a second state, wherein said multiplexer select means causes said first multiplexer to route said carry signal to said ALU and causes said second multiplexer to route said sum signal to said ALU when said multiplexer select means is in said first state, and wherein said multiplexer select means causes said first multiplexer to route said third data value to said ALU and causes said second multiplexer to route said fourth data value to said ALU when said multiplexer select means is in said second state.

8. A multiplier for use in a system having an arithmetic and logic unit (ALU), said multiplier comprising:

a first input terminal for receiving a first data value;

a second input terminal for receiving a second data value;

a carry save stage coupled to said first and second terminals, wherein said carry save stage generates a carry signal and a sum signal in response to said first and second data values;

means for coupling said carry save stage and said first and second input terminals to said ALU, wherein said carry and sum signals and said first and second data values are transmitted to said ALU, whereby said ALU is capable of adding said carry and sum signals to provide a third data value equal to the product of said first and second data values; and means for controlling said means for coupling, said means for controlling having a first and a second state, wherein in said first state said means for controlling causes said means for coupling to route said carry and sum signals to said ALU and to prevent said means for coupling from routing said first and second data values to said ALU, and wherein in said second state said means for controlling causes said means for coupling to route said first and second data values to said ALU and to prevent said means for coupling from routing said carry and sum signals to said ALU.

9. A method of multiplying a first data value and a second data value in a system having an arithmetic and logic unit (ALU), said method comprising the steps of:

transmitting said first and second data values to a carry save stage;

generating a carry signal and a sum signal within said carry save stage in response to said first and second data values;

transmitting said carry signal to a first multiplexer;

transmitting said sum signal to a second multiplexer;

transmitting said first data value to said first multiplexer;

transmitting said second data value to said second multiplexer;

transmitting a multiplexer control signal to said first and second multiplexers;

routing said carry signal through said first multiplexer to said ALU in response to said multiplexer control signal when said multiplexer control signal is in a first state;

routing said sum signal through said second multiplexer to said ALU in response to said multiplexer control signal when said multiplexer control signal is said first state; and adding said carry and sum signals within said ALU to create a third data value equal to the product of said first and second data values.

10. The method of claim 9, further comprising the steps of:

routing said first data value through said first multiplexer to said ALU in response to said multiplexer control signal when said multiplexer control signal is in a second state; and routing said second data value through said second multiplexer to said ALU in response to said multiplexer control signal when said multiplexer control signal is in said second state.

11. A system comprising:

a carry save stage coupled to receive a first data value and a second data value, wherein the carry save stage generates a carry signal and a sum signal in response to the first and second data values;

a first selector circuit coupled to receive the carry signal and the first data value;

a second selector circuit coupled to receive the sum signal and the second data value;

a control signal source coupled to the first and second selector circuits, wherein the control signal source causes the first and second selector circuits to operate in a first mode and a second mode, wherein in the first mode, the first selector circuit passes the carry signal and the second selector circuit passes the sum signal, and wherein in the second mode, the first selector circuit passes the first data value and the second selector circuit passes the second data value; and an arithmetic and logic unit (ALU) coupled to the first and second selector circuits, wherein the ALU receives the signals passed by the first and second selector circuits, and wherein in the first mode, the ALU adds the carry and sum signals to create a third data value equal to the product of the first and second data values.

* * * * *